March 10, 1970  R. B. COX  3,499,827
DISTILLATION PLANT
Filed April 12, 1967  4 Sheets-Sheet 4
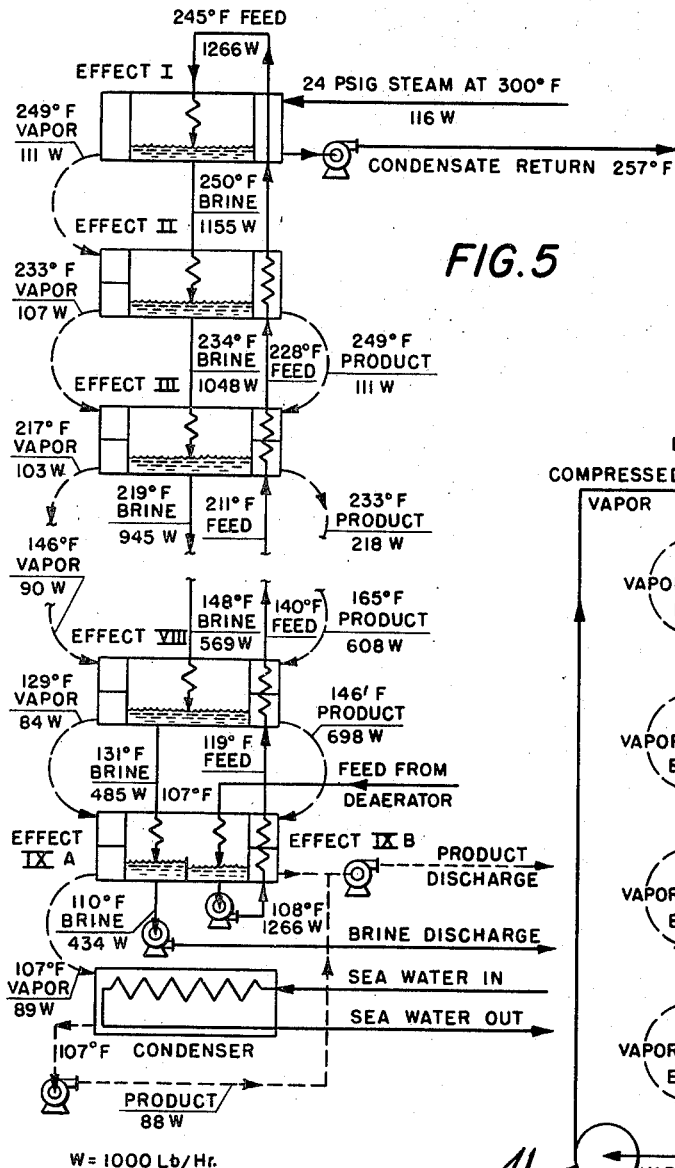
FIG. 5
FIG. 6
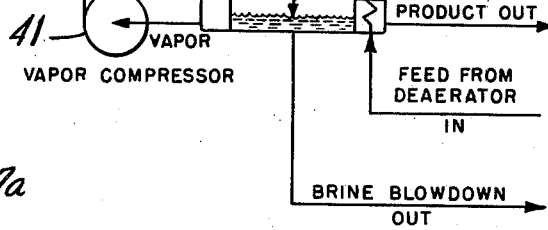
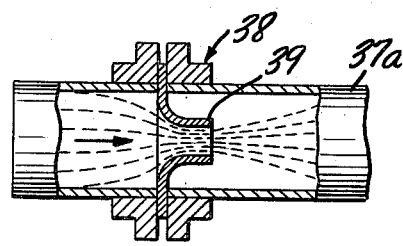
FIG. 7

United States Patent Office 3,499,827
Patented Mar. 10, 1970

3,499,827
DISTILLATION PLANT
Robert Bruce Cox, New Rochelle, N.Y., assignor, by mesne assignments, to the United States of America as represented by the Secretary of the Interior
Filed Apr. 12, 1967, Ser. No. 630,404
Int. Cl. B01d 3/28, 3/22; C02b 1/06
U.S. Cl. 202—173        18 Claims

ABSTRACT OF THE DISCLOSURE

A desalting plant comprises a vertical stack of effects each having horizontal vapor tubes, a perforated pan distributing feed water over the tubes and a pan for collecting unevaporated liquid. Feed liquid is fed to the distributing pan of the uppermost effect and then flows by gravity from one effect to the next. Vapor produced in one effect is conducted to the vapor tubes of the next effect. The condensate is collected and constitutes the product.

---

The present invention relates to a distillation plant capable of handling large quantities of liquid. As the plant is particularly suitable for desalting sea water, it will be discussed with reference to such application without, however, limiting the invention as to the nature of the liquid being treated.

There are a number of methods which are technically capable of desalting sea water. However, the cost of desalting water at the present time, regardless of the method used, is too high to warrant widespread use. Thus the problem remains of producing desalted sea water at a cost comparable to the cost of fresh water from other sources.

The cost of desalting sea water is determined by the capital cost of the desalting plant, the kind and amount of energy consumed and the labor and material costs of operating and maintaining the plant. It is an object of the present invention to reduce all of these basic costs drastically. In accordance with the invention, capital cost and the expense of operating and maintaining the plant are reduced by simplifying plant construction and by eliminating much of the piping and many of the pumps, valves, and other items of accessory equipment heretofore required. Moreover, the plant is designed to use low-cost, low-pressure steam and even this consumption is minimized by attaining heat transfer coefficients and minimizing the energy needed for pumping and for auxiliary equipment.

The desalting of sea water can be accomplished by the consumption of other resources such as energy, cooper, steel and manpower. Large sea water desalting plants require enormous quantities of copper alloy tubing. It is a further object of the invention to reduce the consumption of natural resources and particularly that of critical copper.

As in previous processes, the distillation system of the present invention operates on a multieffect principle in accordance with which vapor produced in one stage or effect is used to evaporate additional liquid in a further effect. However, it has a completely new arrangement and configuration which achieve important economies in construction, operation, and maintenance of the plant.

In accordance with the invention, a selected number of effects are arranged one above another in a vertical stack. Each of the effects comprises a bundle of horizontally extending vapor tubes, means for distributing feed-liquid over the outer surfaces of the tubes to evaporate a portion of the liquid and condense vapor in the tubes, and means for collecting the unevaporated portion of the liquid. Sea water or other liquid to be evaporated is pumped to the liquid distributing means of the uppermost effect and from there flows down by gravity, the unevaporated portion of the liquid collected below the tube bundle in each effect being conducted to the distributor of the succeeding lower effect. Hence, only a single feed pump is required. Vapor from a suitable source, for example steam exhausted from a steam turbine is fed to the vapor tubes of the first effect at the top of the stack. The vapor produced by evaporation of the feed-liquid at the first effect and each succeeding effect—other than the last—is conducted to the next lower effect where it evaporates additional feed-water and is condensed. The resulting condensate is collected and flows to the bottom of the stack where it is discharged as the "product" liquid, i.e., fresh water in the case of a desalting plant.

By reason of its simplicity and compactness and by drastically reducing the number of pumps and other accessory equipment required, a plant in accordance with the invention makes it possible to reduce not only the initial capital expenditure but also operating and maintenance costs of the plant.

The nature and advantages of the invention will be more fully understood from the following description of preferred embodiments illustrated by way of example in the accompanying drawings in which:

FIG. 5 is a partial flow diagram of the desalting plant illustrated in FIGS. 1-4;

Figure 1:
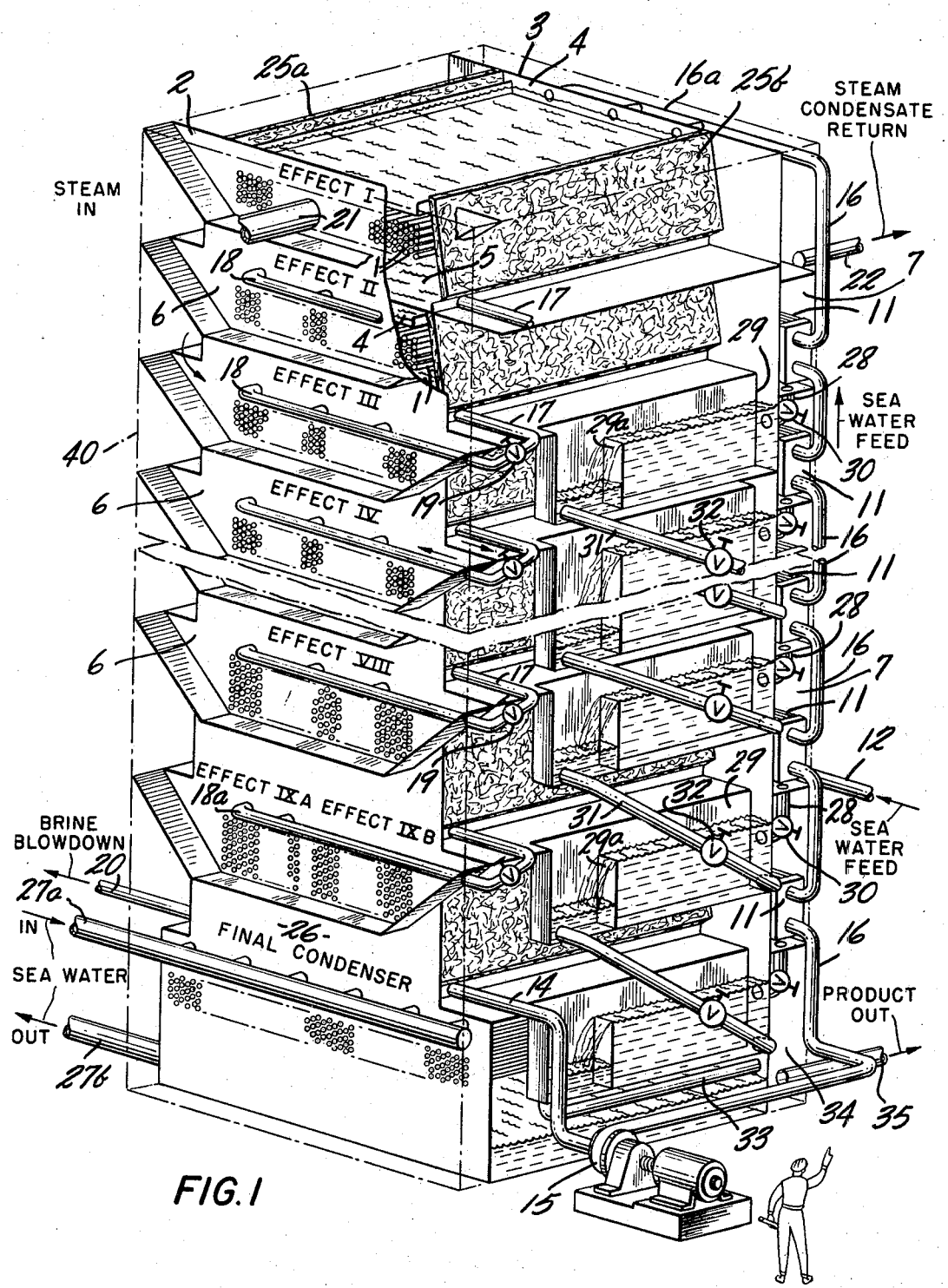
FIG. 1 is a schematic front perspective view of a desalting plant in accordance with the invention, the enclosure of the plant being shown in phantom, and portions being broken away to show the interior and to reduce the size of the drawing.

FIG. 6 is a flow diagram similar to that of FIG. 5 but illustrating a modification in accordance with which vapor produced in a later stage is mechanically compressed and reintroduced into the vapor flow path, and FIG. 7 is a schematic view, partially in axial section, illustrating a sonic valve which may be used in extracting noncondensables from the system while avoiding excessive exhaust of vapor.

In FIGS. 1 to 5 there is illustrated a desalting plant comprising nine effects and a final condenser section arranged one above another in a vertical stack. The effects are identified by roman numerals and effects V to VII are omitted in order to simplify the drawings. While a plant having nine effects has been selected as an example, it will be understood that the number of effects may be increased or decreased according to requirements and conditions existing at the locality where the plant is to be installed and used. In general, increasing the number of effects in a plant increases the initial cost of the plant and decreases operating costs, in particular energy requirements. Hence, in a locality where building costs are high and energy cost is low, it is more economical to use a smaller number of effects while, conversely, if energy costs are high it may be desirable to use a larger number of effects despite the greater capital expenditure. Thus the number of effects used in the plant might vary, for example, from five to twenty.

The individual effects are identical or similar and each comprises a bundle of horizontal vapor tubes 1 extending between head plates 2 and 3, a feed-liquid distributor 4 for distributing sea water or other liquid to be evaporated over the exterior surfaces of the tubes 1 and a collector 5 for collecting the unevaporated portion of the feed-liquid. The vapor tubes 1 extend from a vapor distributing chamber 6 at the front of the unit to a condensate collecting chamber 7 at the rear. While the tubes are in general horizontal, they may be inclined slightly downwardly toward the rear to facilitate discharge of condensate from the tubes. The function of the distributor 4 is to distribute the sea water or other liquid that is to be evaporated uniformly over the outer surfaces of the horizontally extending vapor tubes 1. It is shown in the form of a shallow pan or plate extending horizontally over the bundle of tubes and provided with a multiplicity of small holes or orifices 8 through which the water drips or flows onto the tubes. The tubes are so arranged in relation to the distributor plate 4 and one another as to attain uniform distribution of water over the outer tube surfaces. In general, water impinging on the upper surfaces of a tube will tend to flow halfway around the tube and drip off the lower surface onto the tube below. The rate of flow of the feed-liquid is selected according to other parameters of the plant to provide the desired rate and proportion of evaporation, it being designed to evaporate only a portion of the water in each effect. In order to avoid scaling and reduce corrosion of the tubes, the rate of flow of feed-water over them should be sufficient to keep the tubes constantly wet and avoid excessive concentration of brine on the outer tube surfaces. The distributor plate 4 is open at the sides so that any vapor produced by flash evaporation joins that produced by evaporation of the tubes 1.

The collector 5 is disposed below the vapor tube bundle and its function is to collect that portion of the sea water or other feed-liquid that has not been evaporated in passing over the tubes 1. It is illustrated as being merely an area of the bottom or floor 9 of the effect bounded by side portions 10 having outwardly inclined upper portions 10a.

In the condensate collecting chamber 7 of each effect other than the first, there is provided a heat exchanger 11 which is shown in the form of a bundle of U-shaped tubes (FIG. 2) extending the full width of the unit. While the tubes are illustrated as being U-shaped, it will be understood that they may alternatively be straight with a header plate at each end. A function of the heat exchanger 11 is to condense any vapor that has not been condensed in the vapor tubes 1, it being desired to permit some vapor to flow uncondensed through the tubes 1 and exhaust into the chamber 7 in order to provide a vapor flow through the tubes and thereby assist in discharging condensate from the tubes. Any collection of condensate in the tubes is undesirable since it blankets a portion of the tube surface and thereby decreases the heat exchanging effectiveness of the tubes. The tubes of the heat exchangers 11 are spaced from the head plate 3 so that condensate does not flow over them and are preferably disposed below the discharge ends of the tubes 1 so as to afford free access to the latter tubes for inspection or servicing. The heat exchangers 11 serve the further function of preheating the sea water or other liquid to be evaporated and thereby increase the overall efficiency of the plant.

While all of the effects are of generally similar construction, the ninth effect of the plant shown by way of example in FIGS. 1 to 5 differs from preceding effects in that the feed-water distributor and the collector for the unevaporated portion of the feed-water are divided into two parts so that different liquids can be passed over different portions of the tube bundle and kept separate from one another. The ninth effect is thus divided into two sections which are designated effect IX–A and IX–B respectively in the drawings.

Means is provided for supplying sea water or other liquid to be evaporated to the feed-distributor 4 of the first effect at the top of the unit. The feed-water is preferably preheated before being fed to the distributor of the first effect. While different arrangements for preheating are possible, the arrangement shown by way of example in the drawings comprises feeding sea water through an intake pipe 12 and manifold 13 to the distributor of effect IX–B. Prior to its introduction into the distillation unit, the sea water is preferably deaerated and acidified or otherwise treated to reduce formation of scale. In passing over the tubes of effect IX–B, the feed-water is heated to the boiling point (at the low pressure prevailing in effect IX) to complete its deaeration. From the collector of effect IX–B, the feed-water is discharged through a conduit 14 to the intake of a motor-driven pump 15 by which it is pumped through pipe 16 to manifold 16a which feeds it to the distributor of the first effect.

On its way to the top of the unit, the feed-water passes through heat exchangers 11 so that by the time it reaches the distributor of effect I, it is at the desired temperature, for example, 245° F. From the distributor 4, the preheated sea water flows uniformly at a controlled rate over the vapor tubes 1 of the first effect. A portion of the feed-water is evaporated to produce vapor. The resulting heat exchange causes at least partial condensation of the vapor fed to the horizontally extending vapor tubes as will be described below. The unevaporated portion of the sea water is collected in the collector 5 of the first effect and conveyed by a conduit 17 and manifold 18 to the distributor 4 of the next effect. In like manner, the feed-water passes over the tubes of each successive effect to evaporate a further portion of the water—the unevaporated portion being collected in the collector 5 and conducted by a conduit 17 and manifold 18 to the next effect in the series. The flow of feed-water from one effect to the next is effected by gravity and by a pressure differential which exists by reason of each successive effect operating at a lower temperature and correspondingly lower pressure. Hence no pumps are needed to convey the water from one effect to the next. In order to control the rate of flow from one effect to the next and to preserve the desired pressure differential between successive effects, a valve 19 is provided in each of the conduits 17 leading from the collector 5 of one effect to the distributor 4 of the succeeding effect. In the ninth effect of the particular plant illustrated in the drawings, the unevaporated feed-water from effect VIII is fed only to section IX–A since as described above, effect IX–B is used for preheating the feed-water. Hence manifold 18a of the ninth effect feeds only to the distributor 4 of Section IX–A. In order to avoid formation of scale on the vapor tubes of the unit, it is undesirable to evaporate the sea water completely. Through evaporation in the successive effects of the unit, the sea water is concentrated to brine which is discharged from the collector of the last effect of the series (effect IX–A) through a brine blowdown pipe 20. The brine may be returned to the sea or may be used in the production of salt or otherwise.

Energy for evaporation of the sea water in the successive effects is provided from a suitable power source. In the plant illustrated in FIGS. 1 to 5, energy is supplied in the form of low-pressure steam which is fed to the first effect through a conduit 21. The steam may be supplied, for example, from a suitable boiler or from the exhaust of a steam turbine used for generation of electric power or other purpose. The steam supply pipe 21 is connected with the vapor chamber 6 of the first effect and thereby distributed to the horizontally extending vapor tubes 1, where it is condensed by the flow of sea water over the outsides of the tubes as described above. The resulting condensate is collected in the condensate chamber 7 and discharged through a conduit 22, for example to the feedwater supply of a boiler for generating the steam.

Figure 3:
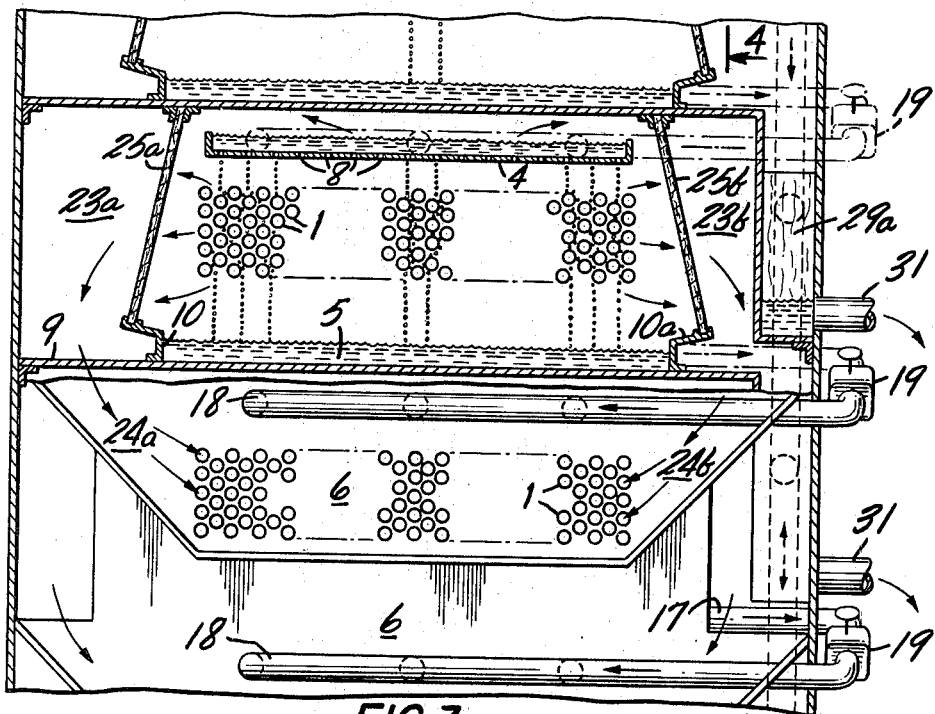
FIG. 3 is a schematic fragmentary cross-sectional view of two effects, the cross section of the upper effect being taken through the tube bundle and that of the lower effect being taken through the vapor distribution chamber.
Figure 4:
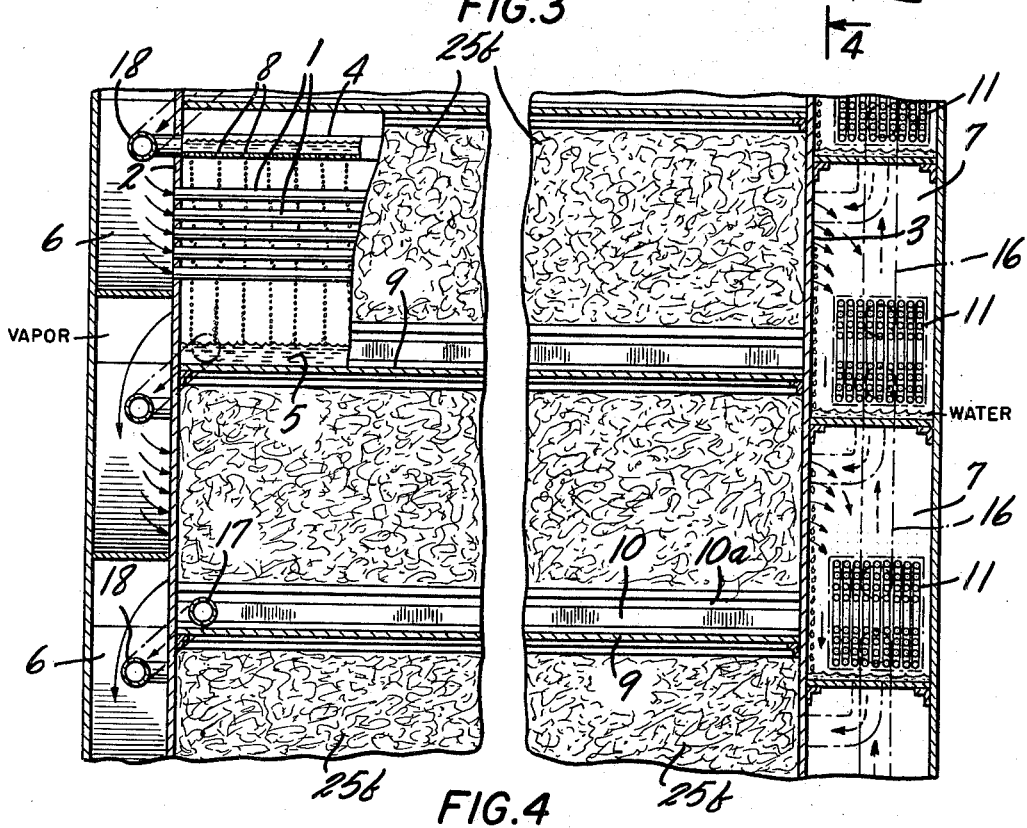
FIG. 4 is a schematic longitudinal section through two of the effects and a portion of the third taken generally on the line 4—4 in FIG. 3, but with portions broken away to show interior construction and to reduce the size of the drawing.

Vapor generated in the first effect by evaporation of a portion of the sea water flowing over the horizontally extending vapor tubes 1 is collected in vapor chambers 23a and 23b at opposite sides of the tube bundle and flows through passages 24a and 24b to the vapor distributing chamber 6 of the next effect. In order to avoid salt-contaminating mist from being carried over from one effect to the next, the vapor is passed through demisters 25a and 25b disposed respectively at opposite sides of the tube bundle (FIG. 3). Since the vapor collecting chambers 23a and 23b extend the full height and full length of the tube bundle, they provide adequate space for large area demisters to permit low velocity flow through them. The demisters are formed of any suitable material such as fiberglass or filamentous material, for example metal or plastic, providing a large contact surface and are preferably inclined as seen in FIG. 3. Liquid collected by the demisters drains down into the collector 5 for the unevaporated portion of the feedwater.

The vapor generated in each effect by evaporation of a portion of the feed-water is thus fed to the horizontally extending vapor tubes 1 of the next effect where it is at least partially condensed and thereby evaporates a further portion of the sea water. As the operating pressure decreases in successive effects, the volume of vapor for the same weight of vapor correspondingly increases. As the flow of vapor is through relatively large chambers and relatively large passages 24a and 24b, a large volume of steam can be accommodated without undue losses through restricted flow. However, when there is a large number of successive effects, it may be desirable to increase the volume of later effects preferably with corresponding increase of size of vapor tubes and tube bundles. While it would be ideal to increase the volume of each successive effect proportionally, economy in construction cost is achieved by making groups of effects identical and increasing the volume of successive effects stepwise rather than continuously. In the illustrated plant, effects VIII and IX are of larger volume. Vapor produced in effects IX–A and IX–B is led to a final condenser 26 where it is condensed by sea water brought in through an intake 27a and discharged through an outlet 27b. A portion of the sea water discharged from the condenser may, after suitable treatment and deaeration, be fed to the feed-water intake 12 of the unit.

The condensate resulting from condensation of vapor in the horizontally extending vapor tubes 1 of each effect is collected in the condensate collecting chamber 7 of the respective effect. In each effect other than effect I, condensation of vapor in the vapor tubes 1 is preferably incomplete so that a selected portion of vapor flows through the tubes into the collecting chamber 7. This vapor flow assists in discharging condensate from the tubes and thereby avoids any accumulation of condensate which might blanket the effective area of the tubes. The portion of vapor not condensed in the tubes 1 is condensed by the heat exchanger 11 which, as described above, is provided in the respective condensate collecting chamber 7.

The condensate collected in chamber 7 constitutes the fresh water output or "product" of the plant and is accordingly led to a suitable product discharge. However, the condensate as received in the collecting chamber 7 still has a heat content which it is desirable to utilize in order to obtain high operating efficiency. The heat energy of the condensate can be recovered in any suitable manner, for example by means of appropriate heat exchangers. In the example illustrated in the drawings, heat energy of the condensate is utilized to reevaporate a portion of the condensate to produce additional vapor. Thus condensate collected in the condensate chamber 7 of effect II is conducted by a short connection 28 to a flash tank 29 which opens into the vapor chamber 23b of effect II. In the flash tank, the water is preferably exposed in a thin layer to promote evaporation, for example by flowing over a dam or weir 29a. As the vapor chamber 23b is at a lower pressure than the condensate chamber 7, a portion of the condensate in the flash tank evaporates, thereby cooling the remaining condensate to a temperature corresponding to the pressure of the vapor chamber. Flow of condensate to the flash tank 29 is suitably controlled, for example by a valve 30 to maintain the selected pressure difference between the respective chambers. After passing over the weir 29a, the condensate is led by a conduit 31 to the flash tank 29 of the next effect on the upstream side of the weir. The temperature of the condensate is thus successively decreased since each successive effect operates at a lower temperature. Flow of condensate from one effect to the next is suitably controlled, for example by a valve 32. The condensate thus flows from one effect to the next and is discharged from the flash tank of the last effect by a conduit 33 into the condensate collecting chamber 34 of the final condenser 26. From the collecting chamber 34, a product discharge line 35 leads to the point of use or storage of the distilled water produced by the plant.

In a sea water distillation plant, it is virtually impossible to avoid the entry of a small quantity of air or other gases which are not condensable at the pressures and temperatures prevailing in the plant. Thus, for example, it is usually not economically feasible to remove all air from the feed-water before it is sent to the evaporator of the first effect. Moreover, since at least some of the effects normally operate at subatmospheric pressure, there may be minor leakage of air into the unit. The presence of air or other noncondensables in the unit is undesirable as they decrease the efficiency of the unit. It is hence desirable to remove noncondensables from the unit to avoid their accumulation.

In the plant shown by way of example in FIGS. 1 to 5, removal of noncondensables from the system is achieved by an exhaust line 37 connected by branches 37a to the condensate collecting chambers 7 of the respective effects. The exhaust line 37 is connected to suitable vacuum-producing means, for example, a vacuum pump or a steam jet ejector. Flow attenuating means is provided in the branch lines 37a to avoid drawing off excessive amounts of vapor. Such attenuating means may, for example, comprise a sonic valve 38 as illustrated schematically in FIG. 7. Such a valve includes a Venturi type nozzle 39 which provides substantially constant flow despite variations in pressure difference. Hence—a substantially constant amount of fluid is withdrawn from each of the effects, notwithstanding the fact that there is a greater pressure differential in the earlier effects.

Figure 2:
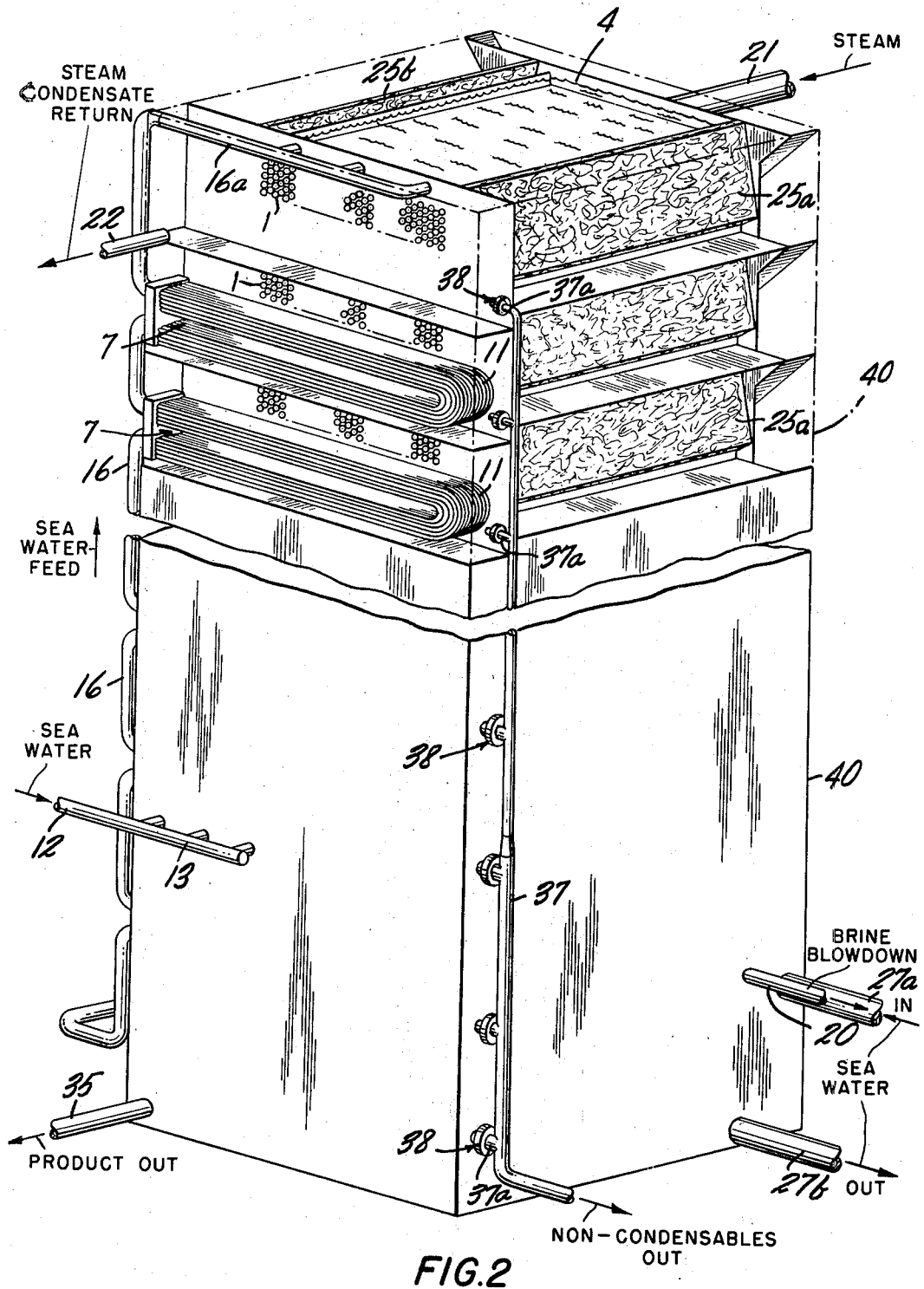
FIG. 2 is a similar rear perspective view of the plant with the upper portion of the housing shown in phantom.

It will be understood that the unit is enclosed in a suitable housing or shell 40 which is shown in phantom in FIG. 1 and in the upper portion of FIG. 2. The shell is fluid tight and preferably heat insulating. Removable portions are provided to offer access to the interior of the unit. Moreover, the effects are suitably segregated from one another except for the fluid passages and conduits as have been described in order to maintain the desired temperature and pressure characteristics in the several effects.

While valves have been shown in the drawing for flow and pressure control, it will be understood that once the operating characteristics and parameters have been established, adjustment is not ordinarily required. Hence, the valves may if desired be replaced by other suitable flow control means, for example metered orifices. Moreover, additional valves or other controls may be provided in the system as desired.

In FIG. 5 there is shown by way of example, a simplified flow diagram illustrating the operation of a desalting plant such as that illustrated in FIGS. 1 to 5. It will be understood that the temperatures and the rates of flow of the several fluids in thousands of pounds per hour are merely by way of example and are selected in accordance with the capacity and operating characteristics of the plant. An will be seen from FIG. 5, the vapor temperature and also the temperature of the unevaporated sea water or brine decreases in the successive effects while conversely, the temperature of the feed-water is progressively increased as it passes successively through the several heat exchangers on its way to the feed-water distributor of the first effect.

In FIG. 6, there is shown by way of example, a simplified flow diagram illustrating how vapor from one of the effects— usually one of the later effects where lower vapor pressure prevails—is compressed to increase its energy content and reintroduced into the system. In the example illustrated in FIG. 6, vapor produced in effect "N" is compressed by a vapor compressor 41 and reintroduced into the vapor distributing chamber of effect I. The vapor compressor 41 may be driven by any suitable means, for example a steam turbine, diesel engine, or electric motor. In the event a steam turbine is used as motor power, the steam required for driving the turbine may be taken from one or more of the effects of the system. It will be understood that the number of effects of the system illustrated in FIG. 6 may be selected as desired and that vapor from any effect may be compressed and reintroduced either into the same effect or one of the other effects of the system in accordance with desired operating characteristics.

While a preferred embodiment of the invention has been illustrated by way of example in the drawings and particularly described, it will be understood that the design of a plant in accordance with the invention may be varied in accordance with the requirements of each installation and that various modifications may be made within the scope of the appended claims.

What I claim is:

1. A distillation plant comprising enclosure means, a plurality of effects arranged one above another, each of said effects comprising two spaced vertical head plates and a bundle of vapor tubes extending generally horizontally between said head plates and opening outside said head plates, means including one of said head plates defining a vapor distributing chamber at one end of said tube bundle, said tubes opening at one end into said vapor distributing chamber, means including the other of said head plates defining a condensate collecting chamber at the opposite end of said tube bundle, said tubes opening at their other ends into said condensate collecting chamber, means including said head plates defining an evaporating space between said head plates and surrounding said tube bundle, feed liquid distributing means disposed above said tube bundle and within said evaporating space for distributing feed liquid over the outer surfaces of said tubes to evaporate a portion of said liquid and condense vapor in said tubes, means below said tube bundle for collecting unevaporated liquid, pump means for feeding liquid to be evaporated to said liquid distributing means of the uppermost of said effects, means for conducting unevaporated liquid by gravity from said unevaporated liquid collecting means of each effect other than the lowermost effect to said liquid distributing means of a succeeding lower effect, means for supplying steam at selected temperature and pressure to said vapor distributing chamber of said uppermost effect, said steam passing into said tubes of said uppermost effect and being at least partially condensed therein while causing evaporation of said liquid on the outside of said tubes to produce vapor in said evaporating space, means defining a vapor collecting chamber within said enclosure means at at least one side of said tube bundle, said vapor collecting space of each effect other than the lowermost effect opening into said evaporating space of the respective effect and into said vapor distributing chamber of the next lower effect to provide for flow of vapor from the evaporating space of one effect to the vapor distributing chamber of the next lower effect, and means for conducting condensate by gravity from said condensate collecting chambers to a product discharge.

2. A distillation plant according to claim 1, in which in at least some of said effects vapor supplied to said tubes is only partially condensed in said tubes and the remaining vapor is discharged from said tubes into said condensate collecting means, the resulting flow of vapor through said tubes assisting in the discharge of condensate from said tubes.

3. A distillation plant according to claim 1, in which means is provided for flowing feed-liquid over at least some of said tubes of at least one effect to complete deaeration of said feed-liquid.

4. A distillation plant according to claim 1, in which means is provided for effecting controlled evacuation of non-condensable fluid from at least some of said effects.

5. A distillation plant according to claim 1 in which said means for distributing feed liquid comprises a perforate plate overlying said bundle of vapor tubes and having apertures providing controlled flow of said liquid over said tubes.

6. A distillation plant according to claim 1 in which means is provided for mechanically compressing vapor from at least one effect and supplying the compressed vapor to the vapor tubes of at least one of said effects.

7. A distillation plant comprising a plurality of effects arranged one above another, each of said effects comprising a bundle of horizontally extending vapor tubes, means above said tubes for distributing feed liquid to be evaporated over the outer surfaces of said tubes to evaporate a portion of said liquid and condense vapor in said tubes and means below said tubes for collecting unevaporated liquid; said feed liquid distributing means opening into the space in which said vapor tubes are located, whereby vapor produced by flash evaporation of said feed liquid joins vapor produced by evaporation of feed liquid contacting the outer surfaces of said tubes, means for feeding liquid to be evaporated to said liquid distributing means of the uppermost of said effects, means for conducting unevaporated liquid by gravity from said collecting means of each said effect other than a lowermost effect to said liquid distributing means of a succeeding lower effect, means for supplying steam to the interior of said tubes of said uppermost effect, means for conducting vapor produced by evaporation of said feed liquid in at least some of said effects to said vapor tubes of another of said effects, means defining a chamber for collecting condensate produced by condensation of vapor in said tubes and for conducting said condensate to a product discharge of said plant, vapor conducted to said tubes in at least some of said effects other than said uppermost effect being only partially condensed in said tubes and the remaining vapor being discharged from said tubes into said condensate collecting chamber means, the resulting flow of vapor through said tubes assisting in the discharge of condensate from said tubes, and condensing means at the discharge end of said tubes to condense vapor discharged from said tubes.

8. A distillation plant according to claim 7, in which said means for conducting vapor from one effect to another comprises a distributing chamber at the entrance end of the tubes of said tube bundle of a succeeding effect and a collecting chamber at at least one side of said tube bundle of a preceding effect opening into with said distributing chamber.

9. A distillation plant according to claim 7, in which said means for conducting unevaporated liquid from said collecting means of one effect to said distributing means of a succeeding effect includes means for effecting a selected pressure reduction.

10. A distillation plant according to claim 8, in which two said collecting chambers are provided at opposite sides of said tube bundle and open into said distributing chamber of a succeeding effect.

11. A distillation plant according to claim 8, in which an evaporator is provided in communication with said collecting chamber and in which means is provided for conducting condensate from said tube bundle of an effect to said evaporator for partial re-evaporation of said condensate, the resulting vapor being added to that produced by evaporation of said feed-liquid.

12. A distillation plant according to claim 11, in which said evaporator comprises means for flowing said condensate in a thin sheet over a surface.

13. A distillation plant according to claim 11, in which said means for conducting said condensate comprises means for restricting the flow of said condensate to effect a selected pressure drop.

14. A distillation plant according to claim 11, in which means is provided for conducting condensate from said evaporator of one effect—after partial re-evaporation therein—to said evaporator of a succeeding effect.

15. A distillation plant according to claim 14, in which means is provided in said means for conducting condensate from said evaporator of one effect to said evaporator of a succeeding effect to effect a selected decrease in pressure.

16. A distillation plant according to claim 8, in which demisting means is positioned in said collecting chamber so that vapor produced by evaporation of feed-liquid on said tubes of said tube bundle passes through said demisting means.

17. A distillation plant comprising a plurality of effects stacked one above another, each of said effects comprises means defining an evaporating space, a bundle of horizontal vapor tubes in said space, feed liquid distributing means disposed above said bundle and having means for distributing feed liquid over the outer surfaces of said tubes to evaporate a portion of said liquid and condense vapor in said tubes, and means below said tube bundle for collecting unevaporated liquid; means for feeding liquid to be evaporated to the said distributing means of the upper effect of said stack, means for conducting unevaporated liquid by gravity from said collecting means of each said effect other than the lowermost effect to said distributing means of a succeeding lower effect, means for supplying steam at selected pressure and temperature to the interior of said tubes of said upper effect, means for conducting vapor produced by evaporation of said feed liquid in one effect to said vapor tubes of a succeeding lower effect, said vapor conducting means comprising a vapor distributing chamber at the entrance end of said vapor tubes and a vapor collecting chamber at at least one side of said tube bundle of one effect opening into said vapor distributing chamber of a succeeding lower effect, flash evaporating means in selected effects for evaporating condensate, means for collecting condensate produced by condensation of vapor in said tubes and conducting said condensate by gravity to said flash evaporating means in a succeeding lower effect for partial re-evaporation, and means for exhausting non-condensable fluid from said condensate collecting means.

18. A distillation plant according to claim 17, in which said condensate collecting means comprises chambers at the opposite ends of said tubes from said vapor distributing chambers, and in which heat exchangers are disposed in communication with at least some of said condensate collecting chambers, and said liquid feeding means comprises means for passing feed liquid through said heat exchangers to preheat said feed liquid and to condense a portion of said vapor received in said condensate collecting chambers and thereby produce a flow of vapor through said tubes to assist in discharging condensate from said tubes into said condensate collecting chambers.

References Cited

UNITED STATES PATENTS

| 1,021,486 | 3/1912 | Rusiecki | 159—18 |
|---|---|---|---|
| 1,200,996 | 10/1916 | Soderlund et al. | |
| 3,165,452 | 1/1965 | Williams | 203—11 |
| 3,245,883 | 4/1966 | Loebel | 203—7 |
| 3,351,120 | 11/1967 | Goeldner et al. | 203—11 X |
| 3,312,600 | 4/1967 | Morton | 202—236 |
| 3,248,304 | 4/1966 | Goeldner | 202—236 X |
| 2,894,879 | 7/1959 | Hickman | 202—174 |
| 3,303,106 | 2/1967 | Standiford et al. | 202—174 |
| 3,305,455 | 2/1967 | Loebel | 202—173 |
| 3,161,574 | 12/1964 | Elam | 202—173 |

FOREIGN PATENTS

| 18,642 | 1893 | Great Britain. |
|---|---|---|
| K-24930 | 12/1956 | Germany. |

OTHER REFERENCES

Chemical Engineering Progress, January 1961, pp. 64, 65 and 66.

NORMAN YUDKOFF, Primary Examiner

F. E. DRUMMOND, Assistant Examiner

U.S. Cl. X.R.

159—13; 202—236; 203—88